US006564015B2

(12) United States Patent
Ishikawa et al.

(10) Patent No.: US 6,564,015 B2
(45) Date of Patent: May 13, 2003

(54) ELECTRONIC FLASH DEVICE

(75) Inventors: Katsuyuki Ishikawa, Tokyo (JP); Takeshi Fujimura, Tokyo (JP); Toshiyuki Terada, Tokyo (JP); Tatsuya Goto, Sagamihara (JP)

(73) Assignees: Taiheiyo Cement Corporation, Tokyo (JP); Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/984,179

(22) Filed: Oct. 29, 2001

(65) Prior Publication Data

US 2002/0061193 A1 May 23, 2002

(30) Foreign Application Priority Data

Oct. 30, 2000 (JP) ....................................... 2000-330858
Dec. 26, 2000 (JP) ....................................... 2000-395929
May 29, 2001 (JP) ....................................... 2001-160983

(51) Int. Cl.[7] .................................................. G03B 7/26
(52) U.S. Cl. .................... 396/206; 396/205; 315/241 P
(58) Field of Search ................................ 396/205, 206; 315/241 P, 241 S

(56) References Cited

U.S. PATENT DOCUMENTS 3,912,968 A * 10/1975 Nakamura .............. 315/241 P
4,037,136 A * 7/1977 Hoene .................... 315/241 P
4,067,028 A * 1/1978 Lermann et al. ............ 396/187
4,369,395 A 1/1983 Stempeck
5,678,077 A 10/1997 Ichikawa et al.
6,005,352 A 12/1999 Odaka

* cited by examiner

*Primary Examiner*—David M. Gray
*Assistant Examiner*—Michelle Nguyen
(74) *Attorney, Agent, or Firm*—Shoemaker and Mattare

(57) ABSTRACT

In an electronic flash device, a driving circuit (12) drives a piezoelectric transformer (13) in response to an oscillation signal of a predetermined frequency, which is output from an oscillation circuit (11). A switch (14) is provided in series in a line that connects the output of the piezoelectric transformer (13) and a capacitor (3). When the switch (14) is ON, the output voltage from the piezoelectric transformer (13) is rectified by a rectifier circuit, and charges the discharge capacitor (3) as electric energy for discharging a discharge tube (4). When the switch (14) is turned off, and the output voltage from the piezoelectric transformer (13) is applied to the discharge tube (4), the discharge tube (4) emits flash light by the electric energy stored in the discharge capacitor (3) in response to that applied voltage as a trigger.

12 Claims, 10 Drawing Sheets

ELECTRONIC FLASH DEVICE

FIELD OF THE INVENTION

The present invention relates to an electronic flash device and, more particularly, to an electronic flash device which can be suitably built in or externally attached to various cameras.

BACKGROUND OF THE INVENTION

Conventionally, a camera which is used to take a sliver halide photo or a digital camera that senses an image using an image sensing element prevalently comprises a so-called electronic flash device that instantaneously illuminates an object upon photographing.

The conventional electronic flash device typically comprises a charge circuit for boosting a power supply voltage, and charging light emission energy for a discharge tube, and a trigger circuit for triggering (initiating) light emission. The charge circuit and trigger circuit respectively adopt coil transformers, as disclosed in, e.g., Japanese Patent Laid-Open No. 2000-241860.

However, since the coil transformer normally has a large outer shape and is heavy in weight, it is not suitable for an electronic flash device for a camera, which is carried by the user.

The present applicants have proposed an electronic flash device in which a charge circuit and trigger circuit respectively adopt piezoelectric transformers, which are lightweight and compact compared to the coil transformer, and have a high degree of freedom in element shape, as shown in FIG. 7, in Japanese Patent Application No. 2000-311384 (not laid-open at the time of filing of this application) filed previously.

That is, the electronic flash device shown in FIG. 7 roughly comprises a charge circuit 21, trigger circuit 22, discharge capacitor 23, and discharge tube 24.

In this circuit, when a switch 52 is ON(CLOSE) and a switch 58 is OFF(OPEN), a driving circuit 53 drives a piezoelectric transformer 54 in accordance with an oscillation signal output from an oscillation circuit 51. An output voltage from the piezoelectric transformer 54 is rectified by a rectifier circuit formed by diodes 55 and 56, and then charges the discharge capacitor 23 as electric energy that makes the discharge tube 24 emit light. When the switch 52 is OFF and the switch 58 is ON, a driving circuit 59 drives a piezoelectric transformer 60 in accordance with an oscillation signal output from an oscillation circuit 57, and the discharge tube 24 emits flash light by energy stored in the discharge capacitor 23 in response to a high voltage output from that piezoelectric transformer as a trigger.

However, in order to attain a further size reduction of the electronic flash device, it is not sufficient to adopt the piezoelectric transformers in the charge circuit 21 and trigger circuit 23, as shown in FIG. 7.

SUMMARY OF THE INVENTION

The present invention has been proposed to solve the conventional problems, and has as its object to provide an electronic flash device which has a simple circuit arrangement and saves space.

In order to achieve the above object, an electronic flash device according to the present invention is characterized by the following arrangement.

That is, an electronic flash device which comprises a discharge tube (4) for emitting flash light, a capacitor (3) for storing electric energy that makes the discharge tube emit light, a charge circuit (1) for charging the capacitor with electric energy, and a trigger circuit (2) for generating a high-voltage signal that triggers the discharge tube to discharge, further comprises a booster circuit (11, 11A, 12, 13) which includes a single piezoelectric transformer and is commonly used as booster means of the charge circuit and the trigger circuit, and switching means (14, 14A–14D) for switching the booster circuit for one of the charge circuit and the trigger circuit so as to apply an output voltage of the piezoelectric transformer to one of the capacitor and the discharge tube.

In a preferred embodiment, the switching means comprises at least one switch or switching element (14) which is provided in series in a line that connects an output of the piezoelectric transformer and the capacitor (see FIG. 1).

In another preferred embodiment, the switching means comprises at least one switch or switching element (14A–14D) for switching an output of the piezoelectric transformer to one of a first line that connects the output to the capacitor and a second line that connects the output to a trigger line of the discharge tube (see FIGS. 2 and 3). In this case; a high-impedance load (17) is preferably connected in parallel with an output of the piezoelectric transformer to prevent the output of the piezoelectric transformer from being fully opened upon switching the switch or switching element.

In either arrangement, an oscillation circuit (11A) of the piezoelectric transformer in the charge circuit and the trigger circuit can output a plurality of types of oscillation signals having different frequencies, and preferably outputs one of these oscillation signals in response to a switching operation of the switching means (see FIG. 4). More specifically, the frequency of the oscillation signal is preferably switched from a low frequency for charge to a high frequency for trigger, as shown in FIG. 5C.

Or the device further comprises a charging voltage detection circuit (18) for detecting a charging voltage of the capacitor, and, in the charge circuit and the trigger circuit, an oscillation circuit (11A) of the piezoelectric transformer can output a plurality of types of oscillation signals having different frequencies, and preferably outputs one of these oscillation signals in response to an output signal from the charging voltage detection circuit (see FIG. 6). More specifically, the frequency of the oscillation signal is preferably switched from a low frequency for charge to a high frequency for trigger, as shown in FIG. 5C.

Alternatively, in order to achieve the above object, an electronic flash device which comprises another device arrangement according to the present invention is characterized by the following arrangement.

That is, an electronic flash device which comprises a discharge tube for emitting flash light, a capacitor for storing electric energy that makes the discharge tube emit light, a charge circuit for charging the capacitor with electric energy, and a trigger circuit for generating a high-voltage signal that triggers the discharge tube to discharge, further comprises a booster circuit (11, 12, 13A) including a single piezoelectric transformer (13A), which is commonly used as booster means of the charge circuit (1) and the trigger circuit (2), and, in that the booster circuit, two secondary electrodes (6, 7) are provided to a secondary region of the piezoelectric transformer at two positions of different distances (L1, L2) from a primary electrode (5) provided to a primary region, one of the secondary electrode serves as a part of the booster means of the charge circuit and the other serves as a part of the booster means of the trigger circuit. Preferably, the secondary electrode (6) closer to the primary electrode of the two secondary electrodes of the piezoelectric transformer serves as a part of the booster means of the charge circuit, and the secondary electrode (7) farther from the primary electrode serves as a part of the booster means of the trigger circuit.

With this device arrangement, since a piezoelectric transformer provided to a single booster circuit uses its two secondary electrodes respectively for a charge circuit and trigger circuit, the charge and trigger functions can be achieved at the same time by the single booster circuit. That is, a compact electronic flash device can be realized by a simple device arrangement.

Note that the electronic flash device with any of the above arrangements can be suitably built in or externally attached to various cameras. In this case, the trigger circuit preferably operates in response to shutter operation of the camera.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Preferred embodiments of an electronic flash device according to the present invention will be described hereinafter in detail with reference to the accompanying drawings.

[First Embodiment]

Figure 1:
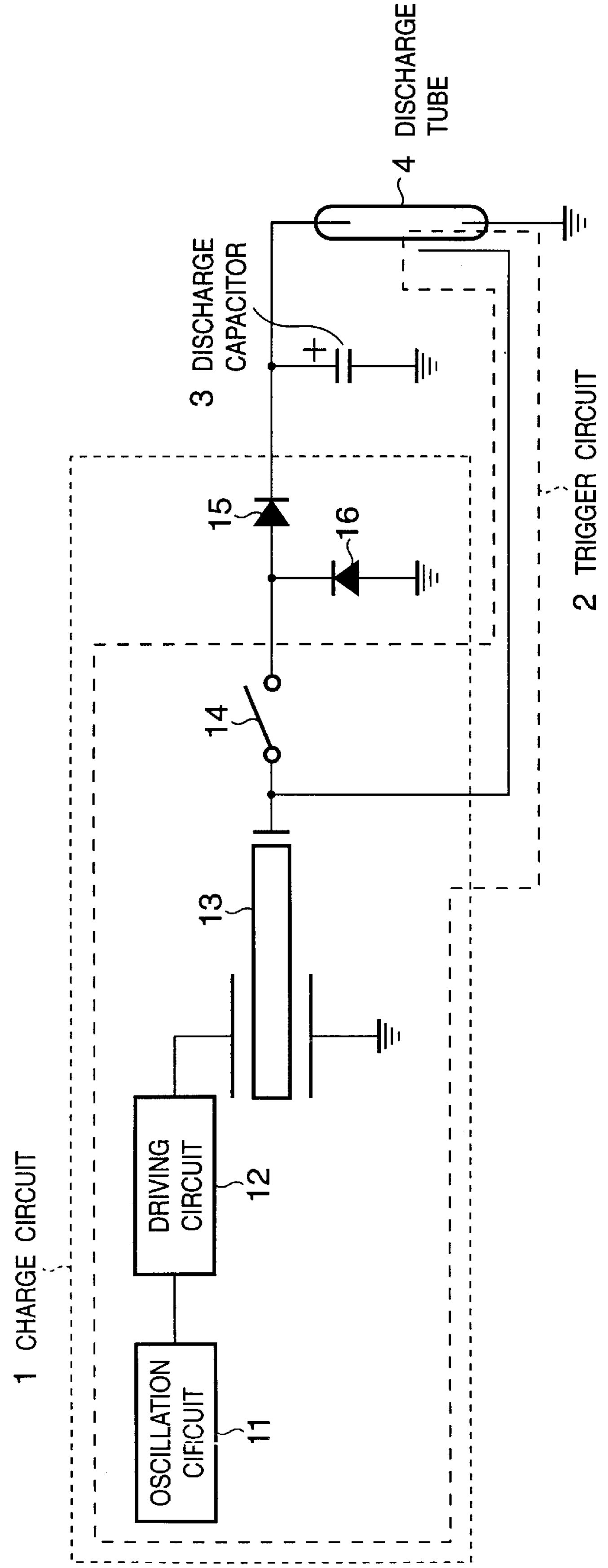
FIG. 1 is a block diagram showing the circuit arrangement of an electronic flash device according to the first embodiment.

FIG. 1 is a block diagram showing the circuit arrangement of an electronic flash device according to the first embodiment.

An electronic flash device shown in FIG. 1 roughly comprises a discharge tube (e.g., a xenon discharge tube) 4 for emitting flash light, a discharge capacitor 3 for storing electric energy that makes the discharge tube 4 emit light, a charge circuit 1 for charging the discharge capacitor 3 with electric energy, and a trigger circuit 2 for generating a high-voltage signal that triggers the discharge tube 4 to discharge.

Note that the charge and trigger circuits described in this embodiment and the second to fifth embodiments to be described later respectively have partially different internal arrangements. However, since the individual charge and trigger circuits have roughly the same functions, they will be referred to as the charge circuit 1 and trigger circuit 2 throughout the embodiments for the sake of simplicity.

The charge circuit 1 and trigger circuit 2 comprise, as common booster means, a single booster circuit which comprises an oscillation circuit 11, driving circuit 12, and piezoelectric transformer 13. The driving circuit 12 drives the piezoelectric transformer 13 in response to an oscillation signal of a predetermined frequency output from the oscillation circuit 11.

A switch (or switching element) 14 is provided in series in a line that connects the output of the piezoelectric transformer 13 and the capacitor 3. When this switch 14 is ON, the output voltage from the piezoelectric transformer 13 is rectified by a conventional rectifier circuit formed by two diodes 15 and 16, and then charges the discharge capacitor 3 as electric energy for discharging the discharge tube 4. On the other hand, when the switch 14 is turned off, and the output voltage from the piezoelectric transformer 13 is applied to the discharge tube 4, the discharge tube 4 emits flash light by the electric energy stored in the discharge capacitor 3 in response to that applied voltage as a trigger.

In the electronic flash device of this embodiment with the above arrangement, when the switch 14 is ON to charge the discharge capacitor 3, since the output load is heavy (large), no high voltage appears at the output side (output terminal) of the piezoelectric transformer 13. By contrast, when the switch 14 is turned off, since the output load becomes lighter unlike when the switch 14 is ON, the output side of the piezoelectric transformer 13 can automatically generate a high voltage which can serve as a trigger signal that makes the discharge tube 4 emit light.

Figure 7:
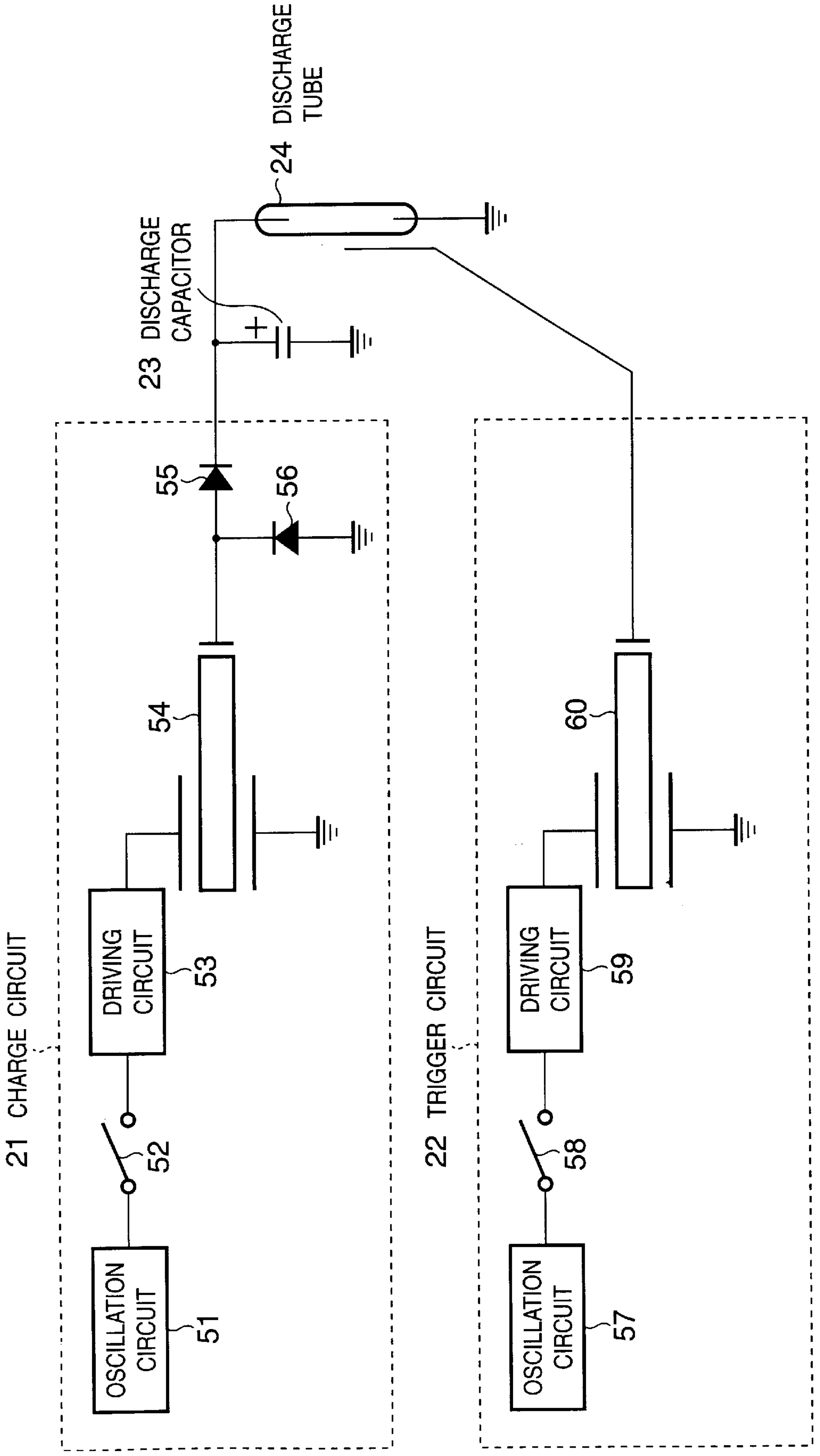
FIG. 7 is a block diagram showing the circuit arrangement of an electronic flash device which has been previously proposed by the present applicant and comprises two sets of piezoelectric transformer inverter circuits.

In this way, this embodiment commonly uses the single piezoelectric transformer 13 for the aforementioned two purposes (for charging the discharge capacitor 3 and for triggering the discharge tube 4 to discharge) in consideration of the characteristics of the piezoelectric transformer element, the booster ratio (output voltage) of which changes depending on the load. This use method is unique, and cannot be implemented by the conventional coil transformer in which the booster ratio is fixed in advance. Furthermore, since the electronic flash device shown in FIG. 1 adopts the circuit arrangement that commonly uses the single booster circuit for the two purposes, one set of an oscillation circuit, driving circuit, and piezoelectric transformer can be omitted compared to the circuit arrangement of the electronic flash device shown in FIG. 7. Therefore, according to this circuit arrangement, the number of required electronic devices can be reduced, and the circuit arrangement can be simplified, thus achieving a reduction of the component cost and total cost of the manufacturing process, and a size reduction of the device.

Hence, according to this embodiment, a compact electronic flash device with a simple circuit arrangement can be realized, and is suitably adopted as an electronic flash device for a camera, which is built in or externally attached to various cameras. In this case, the switch 14 preferably operates in response to shutter operation of the camera.

[Modification 1 of First Embodiment]

Modification 1 based on the electronic flash device according to the first embodiment will be explained below. In the following description, a repetitive description of the same arrangement as that in the first embodiment will be avoided, and only characteristic features of this modification will be mainly explained.

Figure 2:
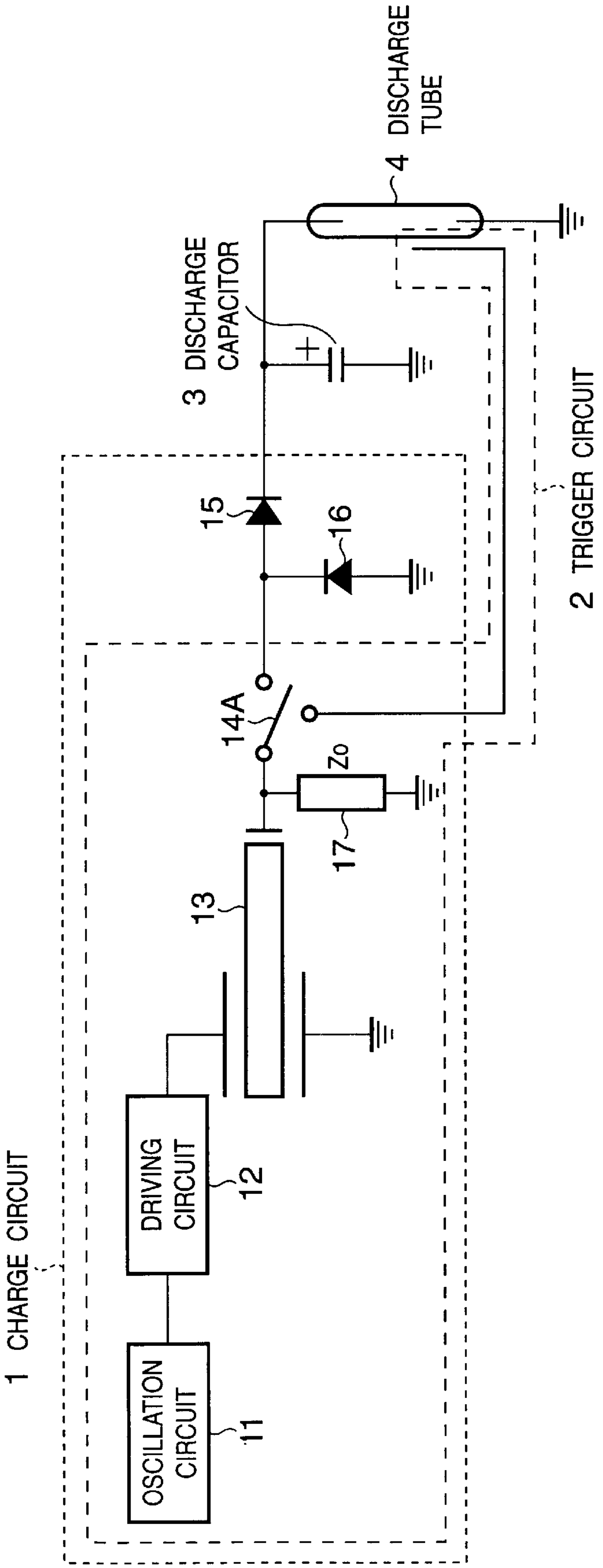
FIG. 2 is a block diagram showing the circuit arrangement of an electronic flash device according to modification 1 of the first embodiment.

FIG. 2 is a block diagram showing the circuit arrangement of an electronic flash device according to modification 1 of the first embodiment, which is substantially the same as the circuit arrangement shown in FIG. 1, except that a switch 14A is arranged in place of the switch 14, and a load (Zo) 17 is added.

In the electronic flash device shown in FIG. 2, the switch 14A is a switch or switching element which operates at the same timing as the switch 14. As shown in FIG. 2, the switch 14A can switch the output from the piezoelectric transformer 13 to one of a first line which connects that output to the discharge capacitor 3, and a second line which connects that output to a trigger line of the discharge tube 4.

The load 17 connected in parallel with the output side of the piezoelectric transformer 13 is a high-impedance load resistor. In this modification, the load 17 is connected to prevent the piezoelectric transformer from being destroyed by an excessively high voltage generated in the piezoelectric transformer 13, when the output of the piezoelectric transformer 13 is fully opened upon switching the switch 14A between the first and second lines.

According to modification 1 with the above arrangement, the same effects as in the electronic flash device shown in FIG. 1 can be obtained.

[Modification 2 of First Embodiment]

Modification 2 based on the electronic flash device according to the first embodiment will be explained below. In the following description, a repetitive description of the same arrangement as that in the first embodiment will be avoided, and only characteristic features of this modification will be mainly explained.

Figure 3:
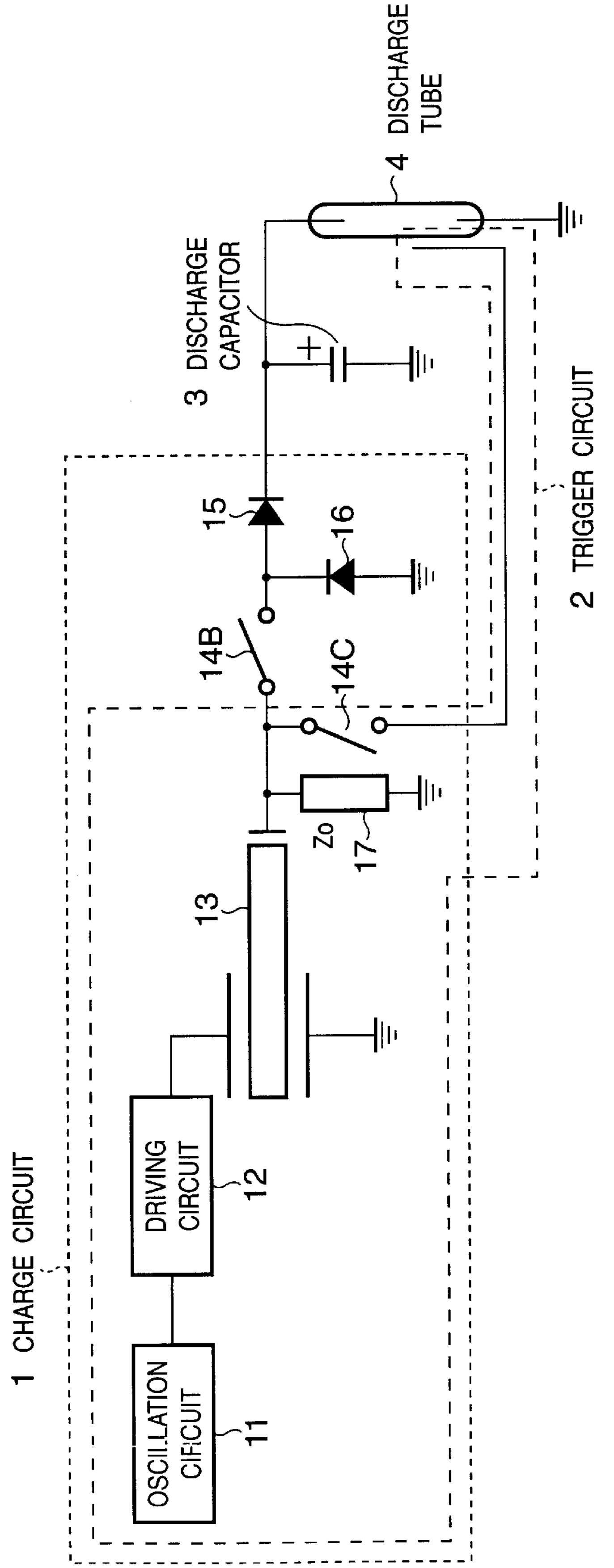
FIG. 3 is a block diagram showing the circuit arrangement of an electronic flash device according to modification 2 of the first embodiment.

FIG. 3 is a block diagram showing the circuit arrangement of an electronic flash device according to modification 2 of the first embodiment, which is substantially the same as the circuit arrangement shown in FIG. 1, except that switches 14B and 14C are arranged in place of the switch 14, and a load (Zo) 17 is added.

In the electronic flash device shown in FIG. 3, the switch 14B is a switch or switching element which is provided in series in a first line that connects the output of the piezoelectric transformer 13 to the discharge capacitor 3, and the switch 14C is a switch or switching element which is provided in series in a second line that connects the output of the piezoelectric transformer 13 to a trigger line of the discharge capacitor 3.

The switches 14B and 14C operate at the same timing as the switch 14 shown in FIG. 1 so that one of these switch is ON while the other is OFF, thus switching the output of the piezoelectric transformer 13 to one of the first and second lines.

The load 17 connected in parallel with the output side of the piezoelectric transformer 13 is a high-impedance load resistance, which is provided for the same reason as in modification 1 (FIG. 2) mentioned above.

According to modification 2 with the above arrangement, the same effects as in the electronic flash device shown in FIG. 1 can be obtained.

In embodiments to be described below, one switch that makes the same switching operation as the switch 14A will be exemplified. Also, the following embodiments may adopt the circuit arrangement which uses the two switches 14B and 14C described in this modification.

[Second Embodiment]

The second embodiment based on the electronic flash devices according to the first embodiment and its modifications mentioned above will be explained below. In the following description, a repetitive description of the same arrangement as that in the first embodiment will be avoided, and only characteristic features of this embodiment will be mainly explained.

Figure 4:
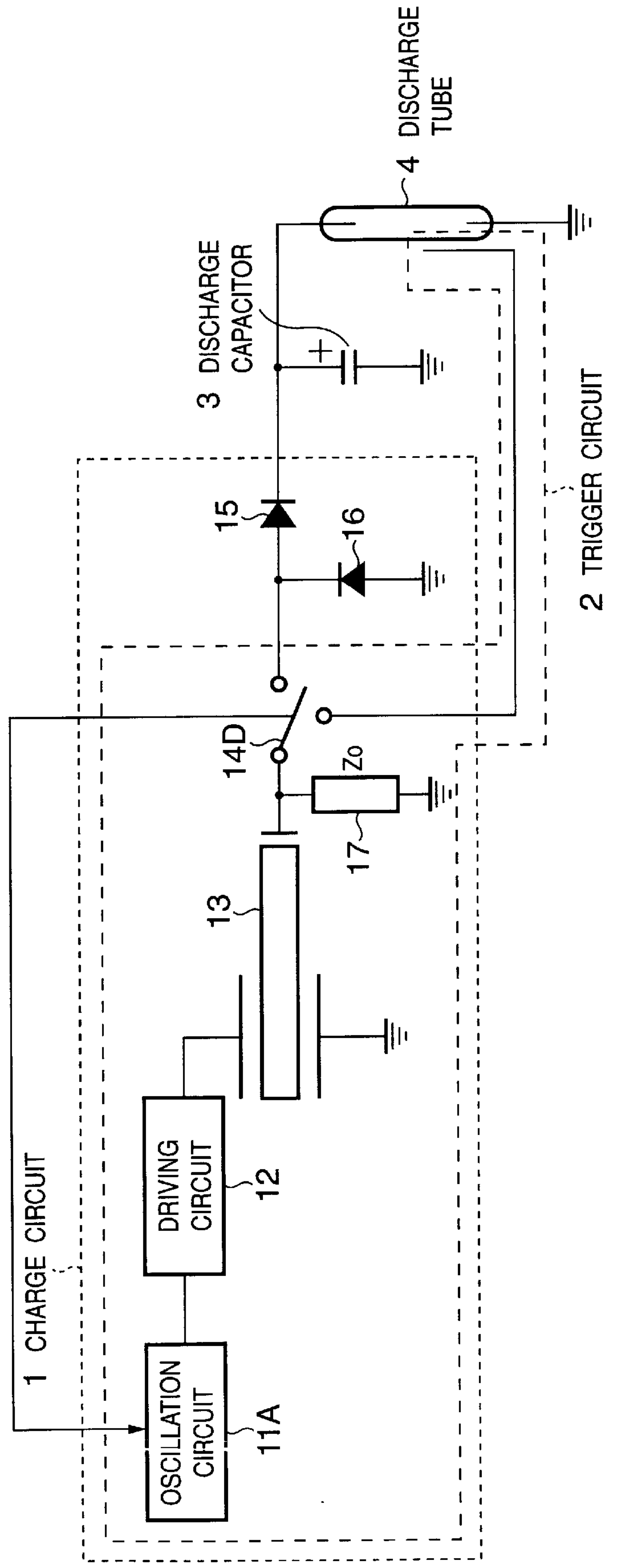
FIG. 4 is a block diagram showing the circuit arrangement of an electronic flash device according to the second embodiment.

FIG. 4 is a block diagram showing the circuit arrangement of an electronic flash device according to the second embodiment.

In the electronic flash device shown in FIG. 4, an oscillation circuit 11A can output a plurality of types of oscillation signals having different frequencies, and changes the frequency of an oscillation signal to be output to the driving circuit 12 in response to (synchronism with) the operation of a switch 14D, which is arranged in place of the switch 14.

In this embodiment, the connection and operation of the switch 14D itself on the output side of the piezoelectric transformer 13 are the same as those of the switch 14A described in modification 1 (FIG. 2), and a high-impedance load 17 is connected in parallel with the output side of the piezoelectric transformer 13 in consideration of generation of the full open state due to connection of the switch 14D for the same reason as in the above modification.

As the circuit arrangement of the oscillation circuit 11A which changes the frequency of an oscillation signal to be output in response to an external input signal, for example, when the oscillation circuit 11A adopts a voltage-controlled oscillator (VCO), a circuit for switching the magnitude of a control voltage input to the VCO may be added. Alternatively, when the oscillation circuit 11A adopts a CR oscillator, a circuit for switching the value of the capacitance of C (capacitor) and/or the value of R (resistor) which form/forms that circuit may be added.

The reason why the frequency of the oscillation signal to be output from the oscillation circuit 11A in response to the operation of the switch 14D will be explained below with reference to the circuit shown in FIG. 2.

Figure 5A:
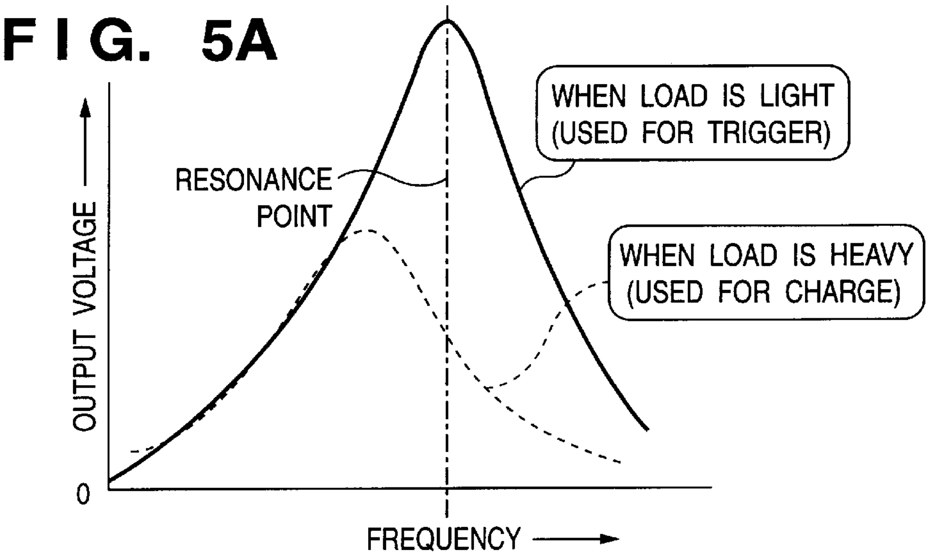
FIGS. 5A to 5C are graphs for explaining the relationship between the output voltage of a piezoelectric transformer 13, which changes depending on the load, and the frequency of an oscillation signal.
Figure 5B:
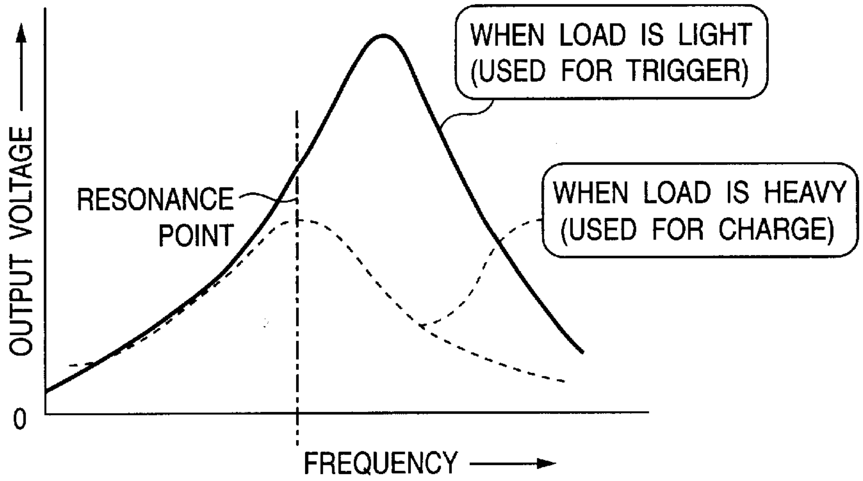
Figure 5C:
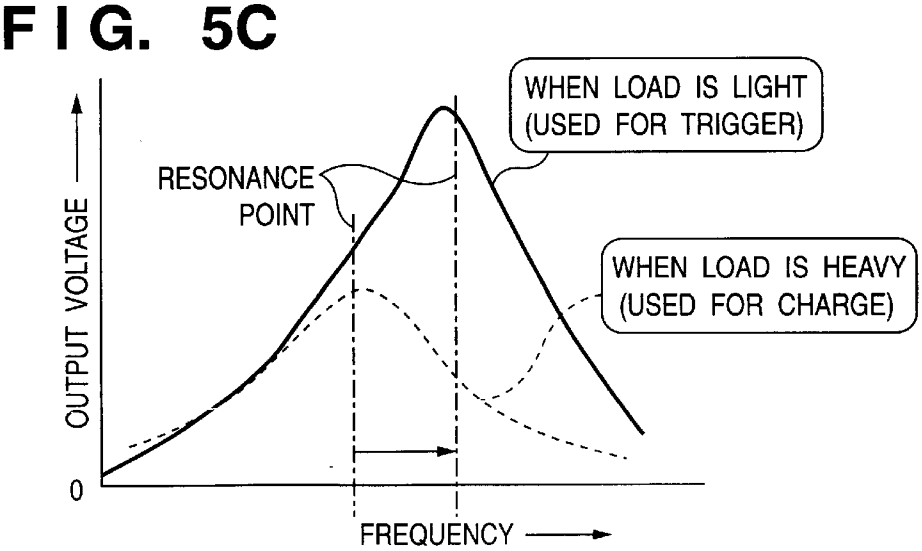

FIGS. 5A to 5C are graphs for explaining the relationship between the output voltage of the piezoelectric transformer 13, which changes depending on the load, and the frequency of the oscillation signal.

Upon driving the piezoelectric transformer 13 by the driving circuit 12, when the output from the transformer 13 charges the discharge capacitor 3 while the switch 14A is connected to the first line, the load is large (heavy); when the output from the transformer 13 is used to trigger the discharge tube 4, the load is small (light). For this reason, the resonance point of the piezoelectric transformer 13 normally varies depending on the load.

In such operation characteristics, when the power supply voltage of the driving circuit 12 is sufficiently higher than the charging voltage of the discharge capacitor 3, the frequency of the oscillation signal to be output from the oscillation circuit 11 can be set in advance at a predetermined frequency at which a high voltage for trigger can be obtained, as shown in FIG. 5A, at the output side of the piezoelectric transformer 13.

By contrast, when the power supply voltage of the driving circuit 12 is low, if the oscillation circuit 11 outputs an oscillation signal having the same frequency as the predetermined frequency, a voltage which is not enough for the charging voltage of the charging capacitor can only be obtained. In this case, in order to make the piezoelectric transformer 13 generate a sufficiently high voltage as the charging voltage, the frequency can be set near the resonance point upon charging, as shown in FIG. 5B. However, even when the switch 14A is switched to the second line for trigger while the frequency near the resonance point remains set, a sufficiently high voltage for trigger cannot be obtained.

Hence, in this embodiment, the frequency of the oscillation signal to be output from the oscillation circuit 11A is switched from a low frequency for charge to a high frequency for trigger in response to (synchronism with) the switching operation of the switch 14D, as shown in FIG. 5C, thus making the piezoelectric transformer 13 always generate optimal output voltages.

According to the second embodiment with the aforementioned circuit arrangement, the same effect as in the electronic flash device shown in FIG. 1 can be obtained. Furthermore, the piezoelectric transformer 13 can be controlled to always generate optimal output voltages to both charging and triggering.

[Third Embodiment]

The third embodiment based on the electronic flash devices according to the first embodiment and its modifications, and the second embodiment mentioned above will be explained below. In the following description, a repetitive description of the same arrangement as those in these embodiments and modifications will be avoided, and only characteristic features of this embodiment will be mainly explained.

Figure 6:
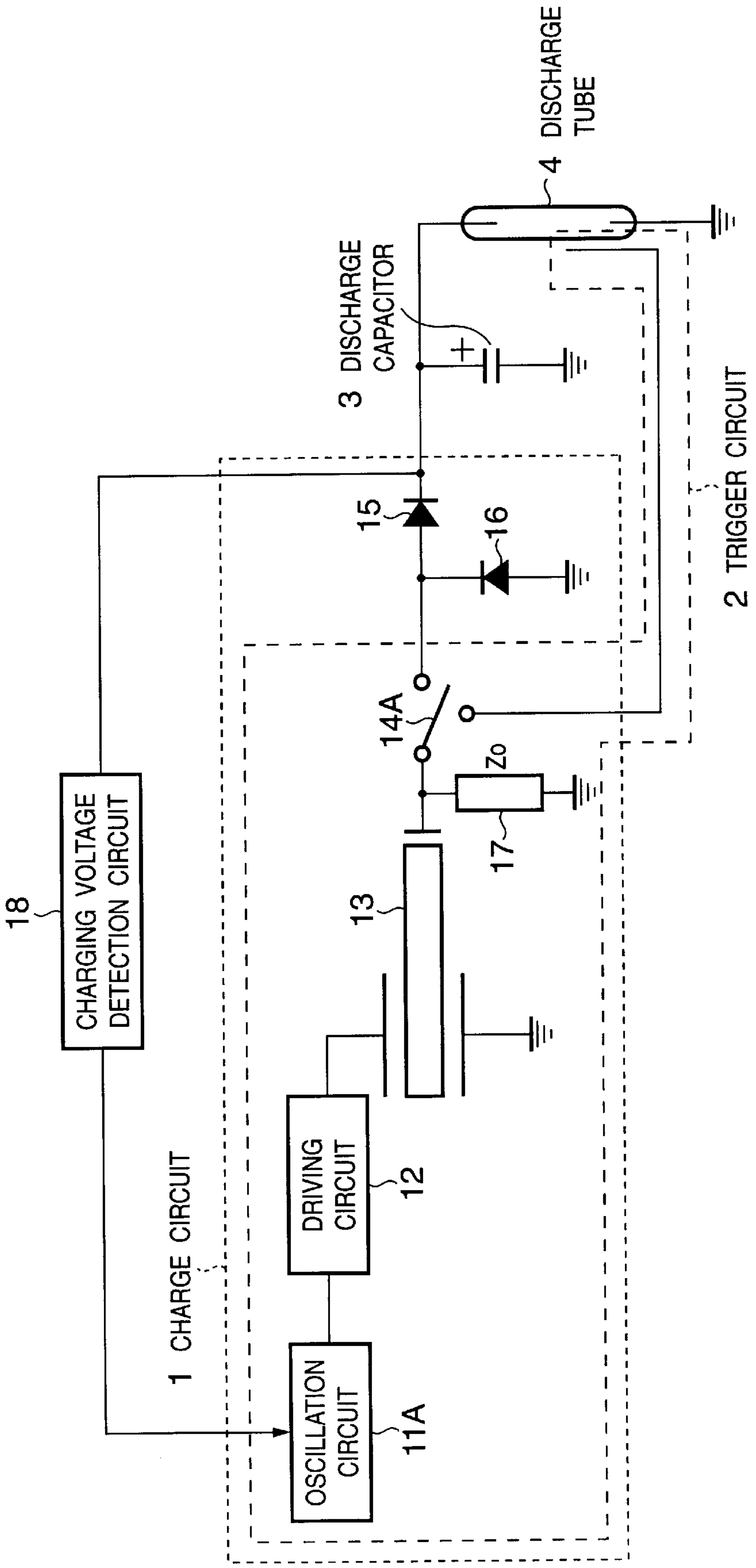
FIG. 6 is a block diagram showing the circuit arrangement of an electronic flash device according to the third embodiment.

FIG. 6 is a block diagram showing the circuit arrangement of an electronic flash device according to the third embodiment.

The electronic flash device shown in FIG. 6 has basically the same circuit arrangement as that of modification 1 (FIG. 2) of the first embodiment described above, and comprises the oscillation circuit 11A described in the second embodiment in place of the oscillation circuit 11, and also a charging voltage detection circuit 18 as a new component.

The charging voltage detection circuit 18 is provided on the output side of the rectifier circuit formed by the diodes 15 and 16, and detects the charging voltage of the discharge capacitor 3. Also, when the detected charging voltage has reached a predetermined level, the circuit 18 sends a signal indicating this to the oscillation circuit 11A. Upon receiving this signal, the oscillation circuit 11A switches the frequency for charge which is output so far to a predetermined frequency for trigger. At this time, the switch 14A remains connected to the first line (the charging side of the discharge capacitor 3), but the charge accumulated in the discharge capacitor 3 is not discharged until the capacitor 3 is triggered by that switch, since the diodes 15 and 16 which form the rectifier circuit are present.

According to the third embodiment with the aforementioned circuit arrangement, the same effect as in the electronic flash device shown in FIG. 1 can be obtained. Furthermore, the piezoelectric transformer 13 can be controlled to always generate optimal output voltages to both charging and triggering.

[Fourth Embodiment]

The fourth embodiment based on the electronic flash device according to the first embodiment will be described below. In the following description, a repetitive description of the same arrangement as those in that embodiment and its modifications will be avoided, and only characteristic features of this embodiment will be mainly explained.

Figure 8:
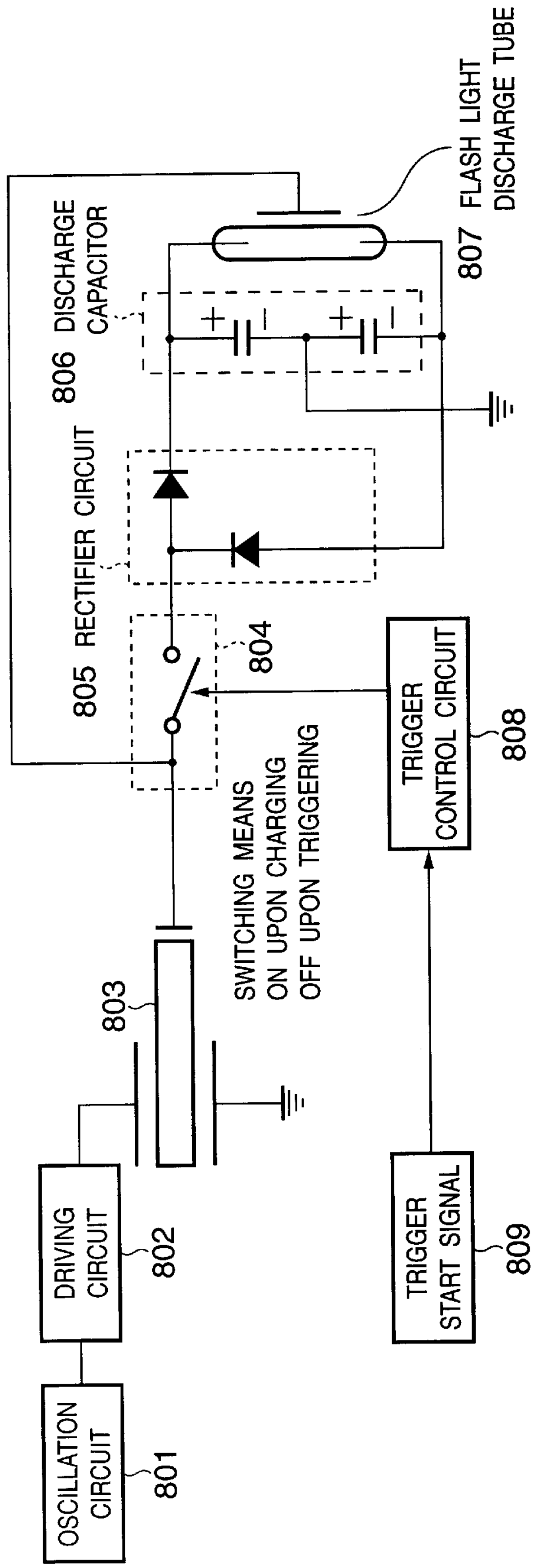
FIG. 8 is a block diagram showing the circuit arrangement of an electronic flash device according to the fourth embodiment.

FIG. 8 is a block diagram showing the circuit arrangement of an electronic flash device according to the fourth embodiment.

The electronic flash device shown in FIG. 8 has basically the same circuit arrangement as that of the first embodiment (FIG. 1), except that two discharge capacitors are connected in series with each other, rectification diodes are connected to the minus side of the series circuit of the capacitors without being grounded, and the node of the capacitors is electrically grounded.

With this arrangement, the first embodiment allows only half-wave rectification, but this embodiment allows full-wave rectification. Hence, the potential difference which is applied to a flash light discharge tube 807 becomes twice that in the first embodiment.

In general, since a voltage as high as about 300 V must be applied across the flash light discharge tube, the device corresponding to the first embodiment must use a piezoelectric transformer which can output a voltage of AC 300 V or higher so that the charging voltage of the discharge capacitor becomes about +300 V. By contrast, since this embodiment can adopt a circuit arrangement that applies a voltage of about ±150 V across the flash light discharge tube, the performance required for the piezoelectric transformer is lowered, and a size reduction can be realized. Also, the discharge capacitors with a low withstand voltage can be used, thus realizing a compact, low-cost circuit.

According to the first to fourth embodiments described above, a compact electronic flash device with a simple circuit arrangement can be provided.

[Fifth Embodiment]

Figure 10:
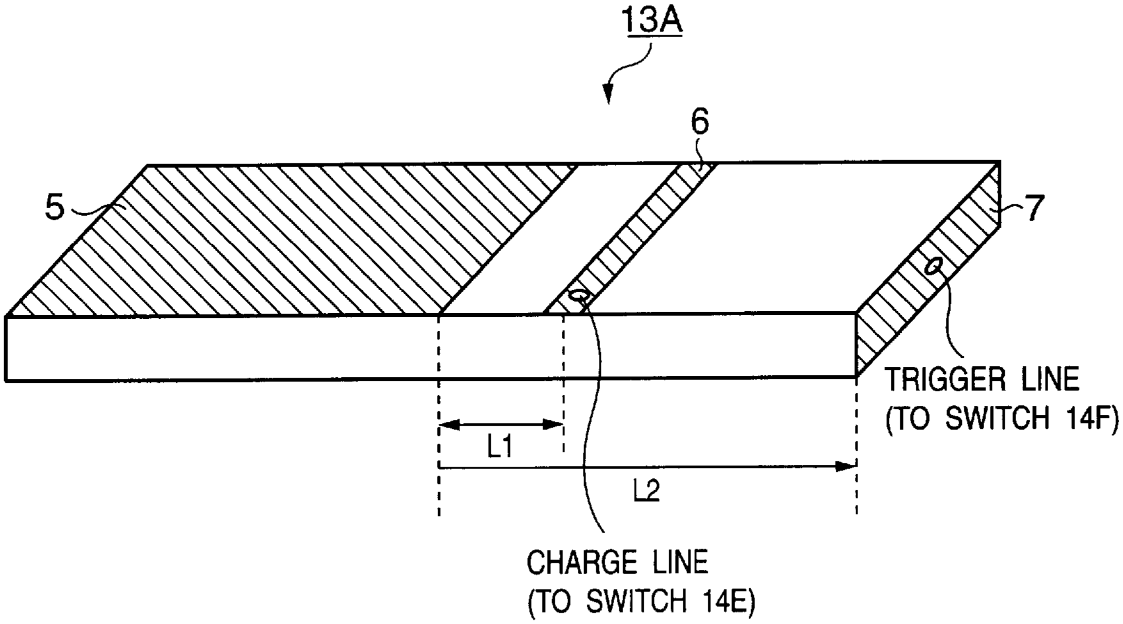
FIG. 10 shows an example of the outer shape of a piezoelectric transformer adopted in the electronic flash device according to the fifth embodiment.

The fifth embodiment based on the electronic flash device according to the first embodiment mentioned above will be explained below. In particular, this embodiment is characterized in that a piezoelectric transformer 13A shown in FIG. 10 is adopted.

Figure 9:
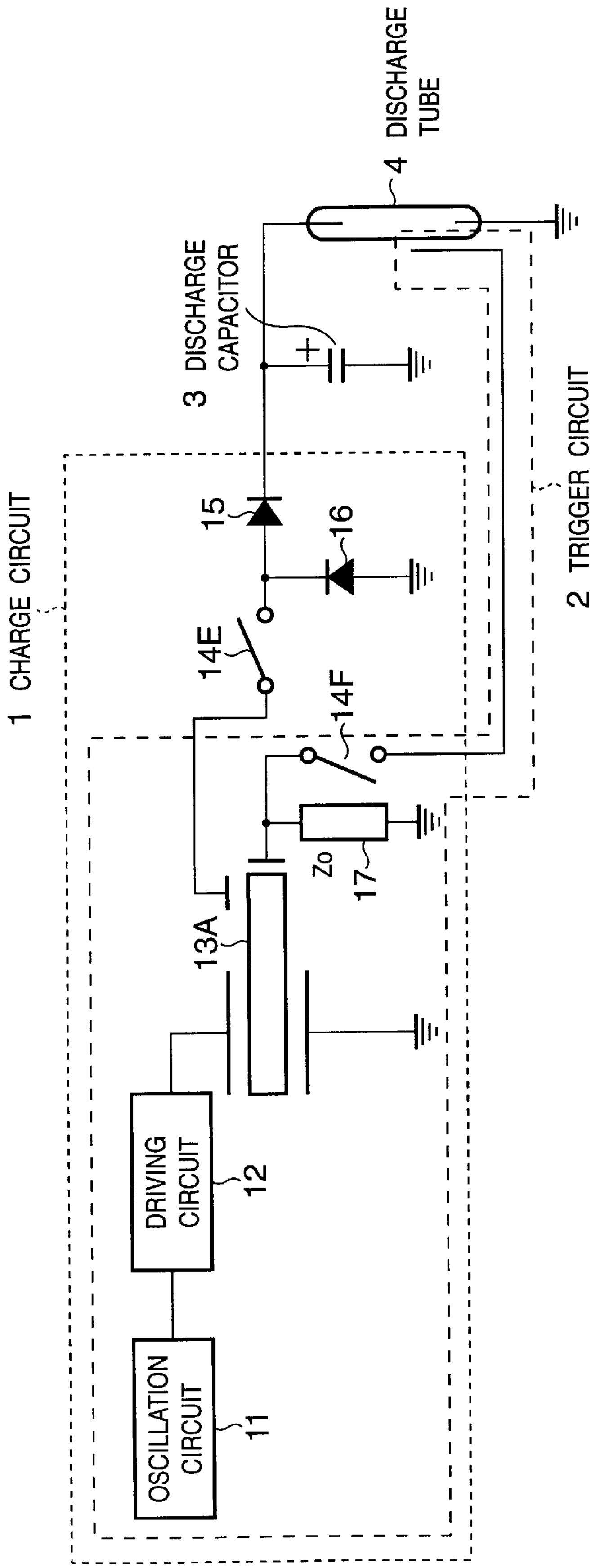
FIG. 9 is a block diagram showing the circuit arrangement of an electronic flash device according to the fifth embodiment.

FIG. 9 is a block diagram showing the circuit arrangement of an electronic flash device according to the fifth embodiment. FIG. 10 shows an example of the outer shape of a piezoelectric transformer adopted in the electronic flash device according to the fifth embodiment.

The electronic flash device shown in FIG. 9 roughly comprises a discharge tube (e.g., a xenon discharge tube) 4 for emitting flash light, a discharge capacitor 3 for storing electric energy that makes the discharge tube 4 emit light, a charge circuit 1 for charging the discharge capacitor 3 with electric-energy, and a trigger circuit 2 for generating a high-voltage signal that triggers the discharge tube 4 to discharge.

The charge circuit 1 and trigger circuit 2 comprise, as common booster means, a single booster circuit which comprises an oscillation circuit 11, driving circuit 12, and piezoelectric transformer 13A. The driving circuit 12 drives the piezoelectric transformer 13A in response to an oscillation signal of a predetermined frequency output from the oscillation circuit 11.

Note that the individual circuit arrangements of the oscillation circuit 11 and driving circuit 12 can adopt devices which are popular currently, and a detailed description thereof in this embodiment will be omitted.

In this booster circuit, secondary electrodes 6 and 7 are provided to the secondary region of the piezoelectric transformer 13A at two positions of different distances (L1, L2) from a primary electrode 5 provided to the primary region, as shown in FIG. 10. Of these two secondary electrodes, the secondary electrode 6 closer to the primary electrode 5 is connected to a charge line (switch 14E) to serve as a part of booster means of the charge circuit 1, and the secondary electrode 7 farther from the primary electrode 5 is connected to a trigger line (switch 14F and load 17) to serve as a part of booster means of the trigger circuit 2.

The switch (or switching element) 14E is provided in series in the charge line that connects the secondary electrode 6 of the piezoelectric transformer 13A and the capacitor 3, and the switch (or switching element) 14F is provided in series in the trigger line that connects the secondary electrode 7 of the piezoelectric transformer and the discharge tube 4.

The load 17 connected in parallel with the secondary electrode 7 of the piezoelectric transformer 13A is a high-impedance load resistor. In this embodiment, the load 17 is connected to prevent the piezoelectric transformer from being destroyed by an excessively high voltage generated in the piezoelectric transformer 13A, when the output of the piezoelectric transformer 13A is fully opened upon switching the switches 14E and 14F between the charge and trigger lines.

When the switch 14E is ON and the switch 14F is OFF, an output voltage that appears at the secondary electrode 6 of the piezoelectric transformer 13A is rectified by a conventional rectifier circuit formed by two diodes 15 and 16, and charges the discharge capacitor 3 as electric energy for discharging the discharge tube 4.

On the other hand, when the switch 14E is OFF and the switch 14F is ON, an output voltage that appears at the secondary electrode 7 of the piezoelectric transformer 13A is applied to the discharge tube 4. In response to that applied voltage as a trigger, the discharge tube 4 emits flash light by the electric energy stored in the discharge capacitor 3.

That is, in this embodiment, the charge circuit 1 and trigger circuit 2 comprise, as common booster means, a single booster circuit which comprises an oscillation circuit 11, driving circuit 12, and piezoelectric transformer 13A, and the driving circuit 12 drives the piezoelectric transformer 13A in accordance with the oscillation signal of the predetermined frequency, which is output from the oscillation circuit 11. The secondary electrodes are provided to the secondary region of the piezoelectric transformer 13A at two positions of different distances from the primary region. Of these two secondary electrodes, one secondary electrode is connected to the charge line (switch 14E) to serve as a part of booster means of the charge circuit 1, and the other secondary electrode is connected to the trigger line (switch 14F and load 17) to serve as a part of booster circuit of the trigger circuit 2.

Upon driving the electronic flash device of this embodiment with the above arrangement by a predetermined power supply voltage, when the switch 14E is ON and the switch 14F is OFF, since the output load is heavy (large) while the discharge capacitor 3 is charged, no high voltage appears at the secondary electrode 7 of the piezoelectric transformer 13A. By contrast, when the switch 14E is OFF and the switch 14F is turned on, since the output load becomes light unlike the ON state of the switch 14E, a high voltage that can serve as an emission trigger signal of the discharge tube 4 appears at the secondary electrode 7 of the piezoelectric transformer 13A.

In this way, this embodiment commonly uses the single piezoelectric transformer 13A for the aforementioned two purposes (for charging the discharge capacitor 3 and for triggering the discharge tube 4 to discharge) in consideration of the characteristics of the piezoelectric transformer element, the booster ratio (output voltage) of which changes depending on the load. This use method is unique, and cannot be implemented by the conventional coil transformer in which the booster ratio is fixed in advance. Furthermore, since the electronic flash device shown in FIG. 9 adopts the circuit arrangement that commonly uses the single booster circuit for the two purposes, one set of an oscillation circuit, driving circuit, and piezoelectric transformer can be omitted compared to the circuit arrangement of the electronic flash device shown in FIG. 7. Therefore, the number of required electronic devices can be reduced, and the circuit arrangement can be simplified, thus achieving a reduction of the component cost and total cost of the manufacturing process, and a size reduction of the device.

Therefore, this embodiment can realize a compact electronic flash device with a simple device arrangement, which is suitably adopted as an electronic flash device for a camera, that is built in or externally attached to various cameras. In this cases, the switches 14E and 14F preferably operate in response to the shutter operation of the camera.

Note that the piezoelectric transformer 13A can be adopted in the booster circuit of the electronic flash device as long as the secondary electrodes are arranged at two positions of different distances from the primary electrode, even when it is of single-plate or multi-layered type.

Also, a piezoelectric transformer in which a terminal made of a conductive resin, metal, or the like is brought into contact with a position between the primary electrode 5 and secondary electrode 7 from outside the element and is used in place of the secondary electrode 6 can be adopted in the booster circuit of the electronic flash device.

The fifth embodiment mentioned above can also provide a space-saving electronic flash device with a simple device arrangement.

As many apparently widely different embodiments of the present invention can be made without departing from the spirit and scope thereof, it is to be understood that the invention is not limited to the specific embodiments thereof except as defined in the claims.

What is claimed is:

1. An electronic flash device which comprises a discharge tube for emitting flash light, a capacitor for storing electric energy that makes said discharge tube emit light, a charge circuit for charging said capacitor with electric energy, and a trigger circuit for generating a high-voltage signal that triggers said discharge tube to discharge, comprising:

a booster circuit which includes a single piezoelectric transformer and is commonly used as booster means of said charge circuit and said trigger circuit; and switching means for switching said booster circuit for one of said charge circuit and said trigger circuit so as to apply an output voltage of said piezoelectric transformer to one of said capacitor and said discharge tube.

2. The device according to claim 1, wherein said switching means comprises at least one switch or switching element which is provided in series in a line that connects an output of said piezoelectric transformer and said capacitor.

3. The device according to claim 1, wherein said switching means comprises at least one switch or switching element for switching an output of said piezoelectric transformer to one of a first line that connects the output to said capacitor and a second line that connects the output to a trigger line of said discharge tube.

4. The device according to claim 3, wherein a high-impedance load is connected in parallel with an output of said piezoelectric transformer to prevent the output of said piezoelectric transformer from being fully opened upon switching said switch or switching element.

5. The device according to claim 1, wherein an oscillation circuit of said piezoelectric transformer in said charge circuit and said trigger circuit can output a plurality of types of oscillation signals having different frequencies, and outputs one of these oscillation signals in response to a switching operation of said switching means.

6. The device according to claim 1, further comprising a charging voltage detection circuit for detecting a charging voltage of said capacitor, wherein, in said charge circuit and said trigger circuit, an oscillation circuit of said piezoelectric transformer can output a plurality of types of oscillation signals having different frequencies, and outputs one of these oscillation signals in response to an output signal from said charging voltage detection circuit.

7. The device according to claim 1, wherein said electronic flash device is an electronic flash device for a camera, which is built in or externally attached to a camera, and said switching means operates in response to a shutter operation of the camera.

8. The device according to claim 1, wherein said capacitor comprises a series circuit of two capacitors which are connected in parallel with said flash light discharge tube and a rectifier circuit in said charge circuit, and a node of the two capacitors is electrically grounded.

9. An electronic flash device which comprises a discharge tube for emitting flash light, a capacitor for storing electric energy that makes said discharge tube emit light, a charge circuit for charging said capacitor with electric energy, and a trigger circuit for generating a high-voltage signal that triggers said discharge tube to discharge, comprising:

a booster circuit including a single piezoelectric transformer, which is commonly used as booster means of said charge circuit and said trigger circuit, wherein, in said booster circuit, two secondary electrodes are provided to a secondary region of said piezoelectric transformer at two positions of different distances from a primary electrode provided to a primary region, one of the secondary electrode serves as a part of the booster means of said charge circuit and the other serves as a part of the booster means of said trigger circuit in response to a switching operation of a switching means.

10. The device according to claim 9, wherein the secondary electrode closer to the primary electrode of the two secondary electrodes of said piezoelectric transformer serves as a part of the booster means of said charge circuit, and the secondary electrode farther from the primary electrode serves as a part of the booster means of said trigger circuit.

11. The device according to claim 9, wherein said electronic flash device is an electronic flash device for a camera, which is built in or externally attached to a camera, and said trigger circuit operates in response to a shutter operation of the camera.

12. The device according to claim 9, further comprising, so as to apply an output voltage generated in the two secondary electrodes to one of said capacitor and said discharge tube, a first switch or switching element and a second switch or switching element, wherein said first switch or switching element is provided between one of the secondary electrode and a charge line of said charge circuit, and said second switch or switching element is provided between the other of the secondary electrode and a trigger line of said trigger circuit.

* * * * *